(12) United States Patent
Shimomura

(10) Patent No.: US 12,213,047 B2
(45) Date of Patent: Jan. 28, 2025

(54) SAFETY CONFIRMATION SYSTEM AND SAFETY CONFIRMATION METHOD

(71) Applicant: AdTECHNICA co. ltd., Shizouka (JP)

(72) Inventor: Satoshi Shimomura, Shizouka (JP)

(73) Assignee: ADTECHNICA CO., LTD., Shizuoka (JP)

( * ) Notice: Subject to any disclaimer, the term of this patent is extended or adjusted under 35 U.S.C. 154(b) by 426 days.

(21) Appl. No.: 17/617,163

(22) PCT Filed: Jun. 2, 2020

(86) PCT No.: PCT/JP2020/021736
§ 371 (c)(1),
(2) Date: Dec. 7, 2021

(87) PCT Pub. No.: WO2020/250750
PCT Pub. Date: Dec. 17, 2020

(65) Prior Publication Data
US 2022/0264276 A1    Aug. 18, 2022

(30) Foreign Application Priority Data

Jun. 11, 2019  (JP) ................ 2019-108431

(51) Int. Cl.
*H04W 4/90*       (2018.01)
*G08B 21/10*      (2006.01)
*H04W 4/029*      (2018.01)

(52) U.S. Cl.
CPC .............. *H04W 4/90* (2018.02); *G08B 21/10* (2013.01); *H04W 4/029* (2018.02)

(58) Field of Classification Search
CPC ........ H04W 4/90; H04W 4/029; G08B 21/10; G08B 25/014; H04M 11/00; H04M 11/04
See application file for complete search history.

(56) References Cited

U.S. PATENT DOCUMENTS

2009/0176476 A1* 7/2009 Foladare .......... H04M 3/42374
455/404.2

FOREIGN PATENT DOCUMENTS

JP   2010233033 A     10/2010
JP   2016152036 A  *   8/2016
(Continued)

OTHER PUBLICATIONS

International Search Report datd Jul. 14, 2020 for PCT Appl. No. PCT/JP2020/021736.

*Primary Examiner* — Umair Ahsan
(74) *Attorney, Agent, or Firm* — Ohlandt, Greeley and Perle, L.L.P.

(57) ABSTRACT

The disclosure simplifies an operation of a user to use a safety confirmation system. The system includes a safety confirmation device capable of communicating with the communication terminal possessed by a user and a management device managing an information terminal different from the communication terminal. The safety confirmation device comprises a generator generating safety confirmation information for confirming user's safety, a first transmitter transmitting the same information to the communication terminal, and a second transmitter transmitting the same information to the management device, and the management device comprises an authenticator associating and storing information indicating the user and information indicating the information terminal in a storage based on authentication information of the user for the safety confirmation device, stored in the communication terminal, and a transmitter transmitting the safety confirmation information received from the safety confirmation device to the information terminal associated with the user in the storage.

19 Claims, 9 Drawing Sheets

(56) References Cited

FOREIGN PATENT DOCUMENTS

| | | |
|---|---|---|
| JP | 201749804 A | 3/2017 |
| JP | 2017107593 A | 6/2017 |
| WO | WO-2015030897 A1 * | 3/2015 ............ H04W 4/022 |

* cited by examiner

Fig. 7
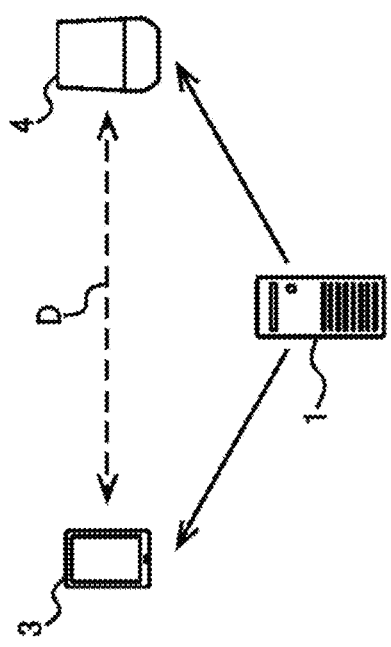
(a)
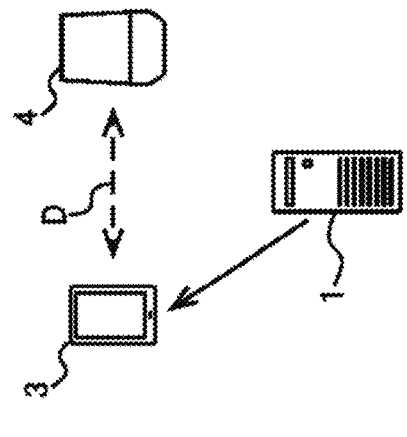
(b)

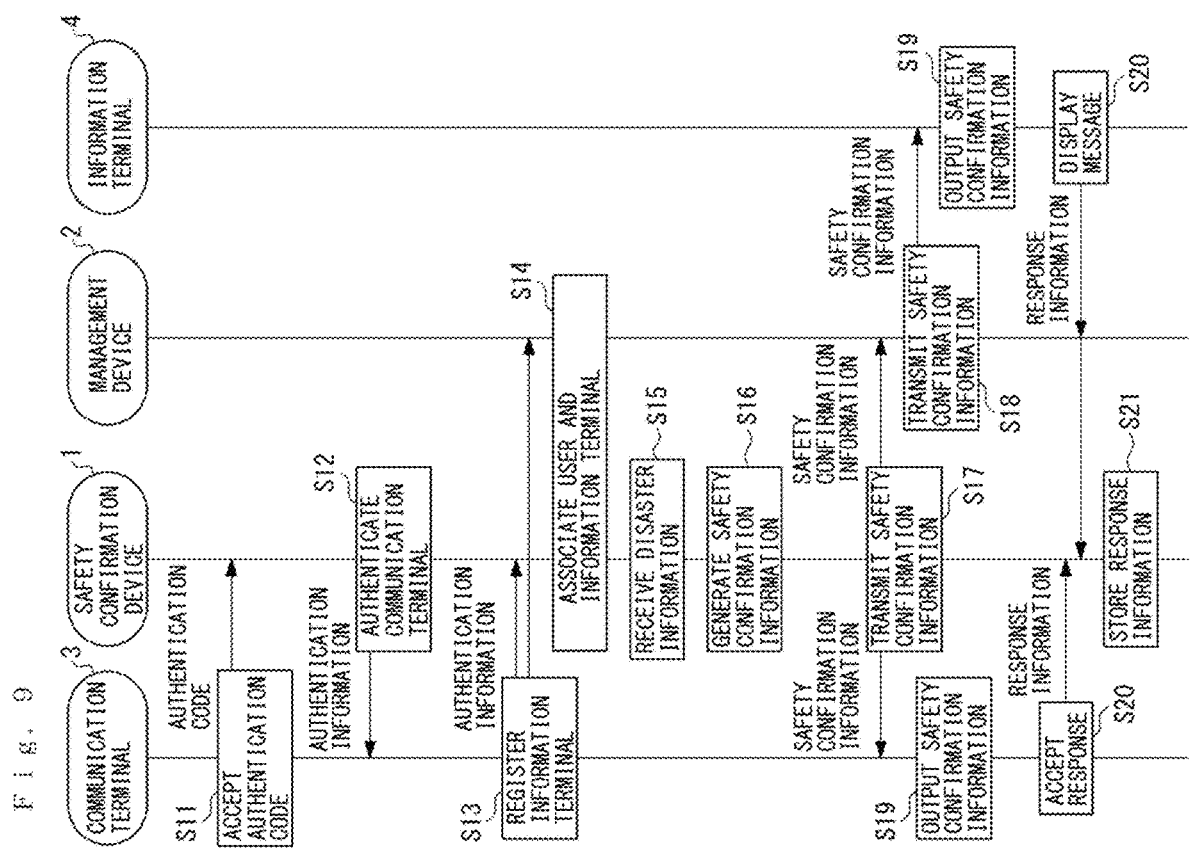

SAFETY CONFIRMATION SYSTEM AND SAFETY CONFIRMATION METHOD

TECHNICAL FIELD

The present invention relates to a safety confirmation system and a safety confirmation method for confirming safety of a user.

BACKGROUND ART

Organizations such as companies have been introducing a safety confirmation system to confirm safety of users such as employees in the event of a disaster. In the safety confirmation system, a user receives safety confirmation information using a mobile communication terminal or the like and transmits a response indicating the safety of the user.

Patent Literature 1 describes, in order to obtain responses from a larger number of users, a system for confirming safety, when there is no answer after performing safety confirmation using an application installed on a mobile communication terminal that is possessed by the user, by sending an e-mail to another terminal possessed by the user.

CITATION LIST

Patent Literature

Patent Literature 1: Unexamined Japanese Patent Application Publication No. 2016-152036

SUMMARY OF INVENTION

Technical Problem

In the system described in Patent Literature 1, since a user needs to install an application and set the reception setting of e-mail for each of the plurality of terminals in advance, an operation required for the user to use the safety confirmation system takes a great deal of labor. The safety confirmation system is required to be easily available so to response can be quickly acquired from a larger number of users in the event of a disaster.

The present invention was made in consideration of the above-described point, and an objective of the present disclosure is to simplify an operation required for a user to use a safety confirmation system.

Solution to Problem

The safety confirmation system according to Embodiment 1 of the present disclosure is a safety confirmation system including: a safety confirmation device to communicate with a communication terminal that is possessed by a user; and a management device to manage an information terminal that is different from the communication terminal, wherein the safety confirmation device includes: a generator to generate safety confirmation information for confirming safety of the user; a first transmitter to transmit the safety confirmation information to the communication terminal; and a second transmitter to transmit the safety confirmation information to the management device, and the management device includes: an authenticator to associate and stores information indicating the user and information indicating the information terminal in a storage, based on authentication information of the user for the safety confirmation device that is stored in the communication terminal; and a transmitter to transmit the safety confirmation information received from the safety confirmation device to the information terminal that is associated with the user in the storage.

The second transmitter may transmit, to the management device, voice data for outputting the safety confirmation information by voice from a speaker equipped in the information terminal.

The generator may generate safety confirmation information for training as the safety confirmation information at the time of training, generate real safety confirmation information that is different from the safety confirmation information for training as the safety confirmation information at the time of disaster occurrence, and the second transmitter may transmit voice data for training in order to output the safety confirmation information for training by voice to the management device at the time of training, and transmit real voice data in order to output the real safety confirmation information by voice to the management device at the time of disaster occurrence.

The first transmitter may transmit the safety confirmation information to the communication terminal without going through the management device, and the second transmitter may transmit the safety confirmation information to the information terminal through the management device.

The safety confirmation device may further include a response receiver to receive a response to the safety confirmation information from at least one of the communication terminal or the information terminal.

The generator may generate safety confirmation information for training as the safety confirmation information at the time of training, and generate real safety confirmation information as the safety confirmation information at the time of disaster occurrence, and, based on whether the response receiver received the response to the safety confirmation information for training from the communication terminal or the information terminal, the first transmitter and the second transmitter may change an order in which the real safety confirmation information is transmitted to the communication terminal and the information terminal.

The safety confirmation device may further include a third transmitter to transmit the response to at least one of a communication terminal or information terminal associated with a family member of the user when the response receiver receives the response.

The generator may generate safety confirmation information for training as the safety confirmation information at the time of training, and generate real safety confirmation information as the safety confirmation information at the time of disaster occurrence, and the first transmitter and the second transmitter may transmit the real safety confirmation information with frequency that is different from the frequency of transmitting the safety confirmation information for training.

The safety confirmation device may further include a disaster information receiver to receive disaster information indicating occurrence of a disaster, and the generator may generate the safety confirmation information based on the disaster information received by the disaster information receiver.

The safety confirmation device may further include a location information acquirer to acquire location information indicating locations of the communication terminal and the information terminal, and the generator may generate the safety confirmation information based on the disaster information at the location of at least one of the communication terminal or the information terminal.

The safety confirmation device may further include a location information acquirer to acquire location information indicating locations of the communication terminal and the information terminal, and the first transmitter and the second transmitter may transmit the safety confirmation information to both the communication terminal and the information terminal when a distance between the location of the communication terminal and the location of the information terminal is equal to or greater than a reference value, and transmit the safety confirmation information to a predetermined one of the communication terminal and the information terminal when the distance between the location of the communication terminal and the location of the information terminal is less than the reference value.

The safety confirmation method according to Embodiment 2 of the present disclosure, in a safety confirmation system including a safety confirmation device to communicate with a communication terminal possessed by a user and a management device to manage an information terminal that is different from the communication terminal, includes: by the management device, associating and storing information indicating the user and information indicating the information terminal in a storage based on authentication information of the user for the safety confirmation device that is stored in the communication terminal; by the safety confirmation device, generating safety confirmation information for confirming safety of the user; by the safety confirmation device, transmitting the safety confirmation information to the communication terminal; by the safety confirmation device, transmitting the safety confirmation information to the management device; and by the management device, transmitting the safety confirmation information received from the safety confirmation device to the information terminal associated with the user in the storage.

Advantageous Effects of Invention

According to the present disclosure, an operation required for a user to use a safety confirmation system can be simplified.

BRIEF DESCRIPTION OF DRAWINGS

FIGS. 7A and 7B are schematic diagrams of a method of changing the transmission destination according to the distance between the communication terminal and the information terminal;

FIG. 9 is a sequence diagram of a safety confirmation method executed by the safety confirmation system according to the embodiment.

DESCRIPTION OF EMBODIMENTS

[Overview of Safety Confirmation System S]

Figure 1:
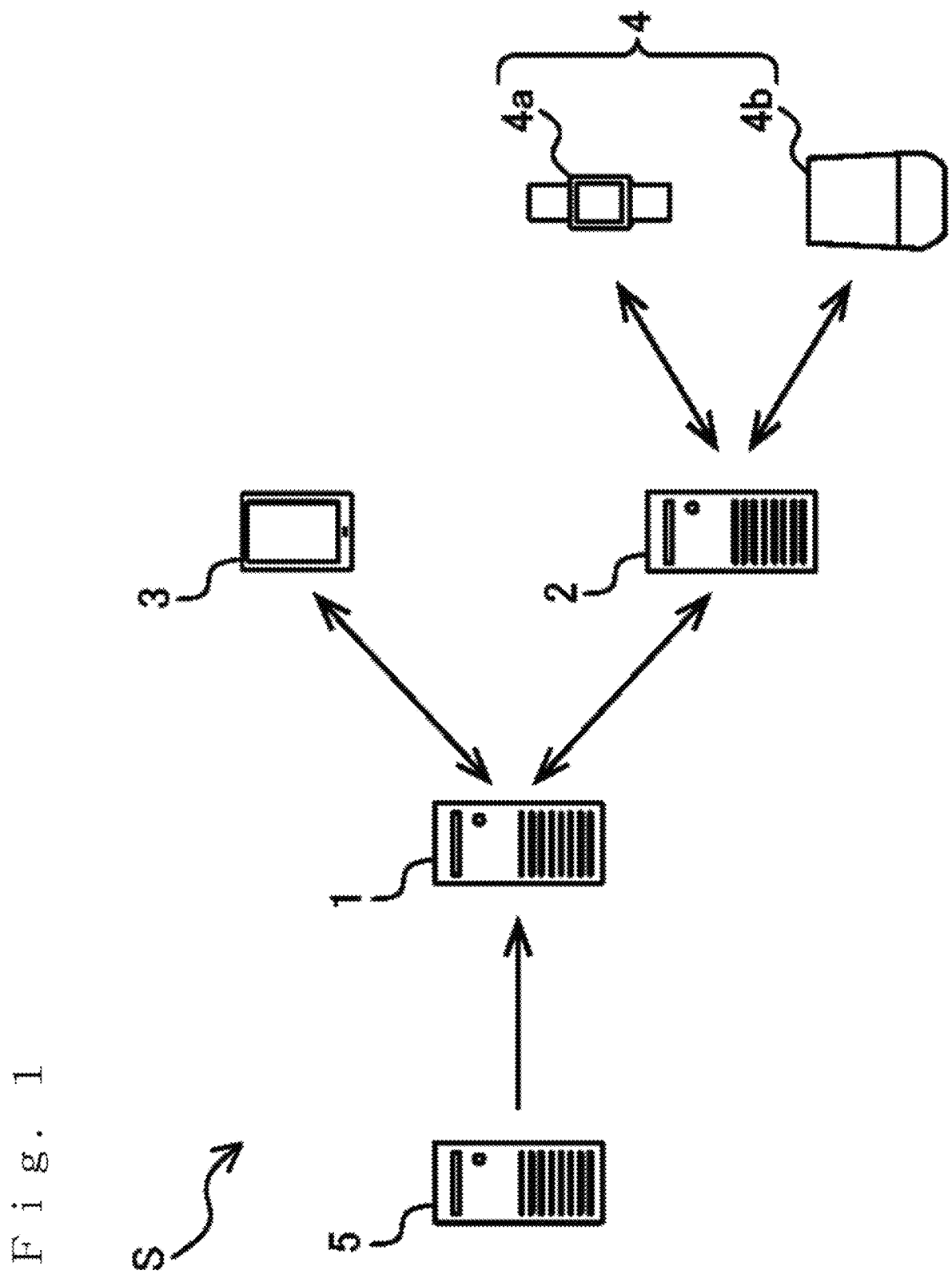
FIG. 1 is a schematic diagram of a safety confirmation system according to an embodiment.

FIG. 1 is a schematic diagram of a safety confirmation system S according to the present embodiment. The safety confirmation system S includes a safety confirmation device 1, a management device 2, a communication terminal 3, an information terminal 4, and a disaster information provision device 5. The information terminal 4 includes at least one of a wearable terminal 4a or a speaker terminal 4b. The safety confirmation system S may also include other devices such as a server and a terminal.

The safety confirmation device 1 is a computer that transmits safety confirmation information to the communication terminal 3 and the information terminal 4 and receives and stores a response from a user. In the present embodiment, the user is a person whose safety is to be confirmed by the safety confirmation system S, for example, a person who constitutes an organization (a company, a group, or the like) that uses the safety confirmation system S.

The management device 2 is a computer that manages transmission and reception of information to and from the information terminal 4. The management device 2 transfers safety confirmation information transmitted by the safety confirmation device 1 to the information terminal 4 and transfers response information transmitted by the information terminal 4 to the safety confirmation device 1. The management device 2 can communicate with the safety confirmation device 1, the communication terminal 3, and the information terminal 4 via a network such as the Internet and a local area network.

The communication terminal 3 is a computer that outputs information for a user and receives input from the user. For example, the communication terminal 3 is a mobile communication terminal, such as a smartphone and a tablet terminal, or a computer terminal, such as a personal computer. The communication terminal 3 includes an operation unit, such as a touch panel, capable of accepting an operation from a user and a display, such as a liquid crystal display, capable of displaying information. The communication terminal 3 can communicate with the safety confirmation device 1 and the management device 2 via a network such as the Internet and a local area network.

The information terminal 4 is a computer that outputs for a user and accepts input from the user. The information terminal 4 can communicate with the management device 2 via a network such as the Internet and a local area network. The information terminal 4 includes at least one of a wearable terminal 4a or a speaker terminal 4b, and is also referred to as an Internet of things (IoT) terminal.

The wearable terminal 4a is a terminal that can be attached to the body a user, and is also referred to as a wearable device. The wearable terminal 4a is, for example, a wristwatch type or spectacle type terminal. The wearable terminal 4a includes an operation unit, such as a touch panel, capable of accepting an operation from a user and a display, such as a liquid crystal display, capable of displaying information. The speaker terminal 4b is a terminal that outputs information by voice for a user and accepts input of information by voice from the user, and is also referred to as a smart speaker. The speaker terminal 4b has an audio outputter such as a speaker that outputs information by voice and an audio inputter such as a microphone capable of acquiring a voice uttered by a user.

The disaster information provision device 5 is a computer that provides disaster information indicating the details of an occurring disaster when a disaster, such as an earthquake, a fire, and a tsunami, occurs with the safety confirmation device 1. The disaster information provision device 5 can communicate with the safety confirmation device 1 via a network such as the Internet and a local area network.

An outline of the method by which the safety confirmation system S of the present embodiment confirms safety of a user is described below. First, a user is authenticated by the safety confirmation device 1 at the communication terminal 3 possessed by the user. The authentication is performed, for example, by the user inputting an authentication code, a password, or the like on the communication terminal 3. When the authentication is successful, the communication terminal 3 stores the authentication information for the safety confirmation device 1. Next, at the communication terminal 3, the user registers an information terminal 4 that is different from the communication terminal 3, in the management device 2 using the authentication information for the safety confirmation device 1. As a result, the user and the information terminal 4 are associated with each other in the management device 2.

The safety confirmation device 1 generates safety confirmation information for confirming safety of a user when the safety confirmation device 1 receives disaster information from the disaster information provision device 5. The safety confirmation device 1 transmits the generated safety confirmation information to the communication terminal 3 possessed by the user and to the management device 2 that manages the information terminal 4 that is different from the communication terminal 3. At this time, the safety confirmation device 1 may simultaneously transmit the safety confirmation information to the communication terminal 3 and the management device 2, or may sequentially transmit the safety confirmation information.

When the management device 2 receives the safety confirmation information from the safety confirmation device 1, the management device 2 transfers the safety confirmation information to the information terminal 4 associated with the user. The communication terminal 3 and the information terminal 4 output the safety confirmation information respectively received from the safety confirmation device 1 and the management device 2 for the user.

The user inputs a response indicating the safety of the user on at least one of the communication terminal 3 or the information terminal 4 that output the safety confirmation information. At least one of the communication terminal 3 or the information terminal 4 transmits response information indicating the response input by the user to the safety confirmation device 1. The safety confirmation device 1 receives and stores the response information.

In this way, the safety confirmation system S associates a user with the information terminal 4 based on authentication information for the safety confirmation device 1 that is stored in the communication terminal 3. When a disaster occurs, the safety confirmation system S transmits safety confirmation information to both the communication terminal 3 with which the user has been authenticated and the information terminal 4 that is associated with the user. As a result, the user can receive the safety confirmation information from the safety confirmation system S through both the communication terminal 3 and the information terminal 4 without performing different setting operations for the communication terminal 3 and the information terminal 4. Therefore, the safety confirmation system S can simplify an operation required for a user to use the safety confirmation system S. In addition, the safety confirmation system S suppresses omission of a response to safety confirmation information by a user and can obtain responses from a larger number of users by transmitting the safety confirmation information to a plurality of terminals.

[Configuration of Safety Confirmation System S]

Figure 2:
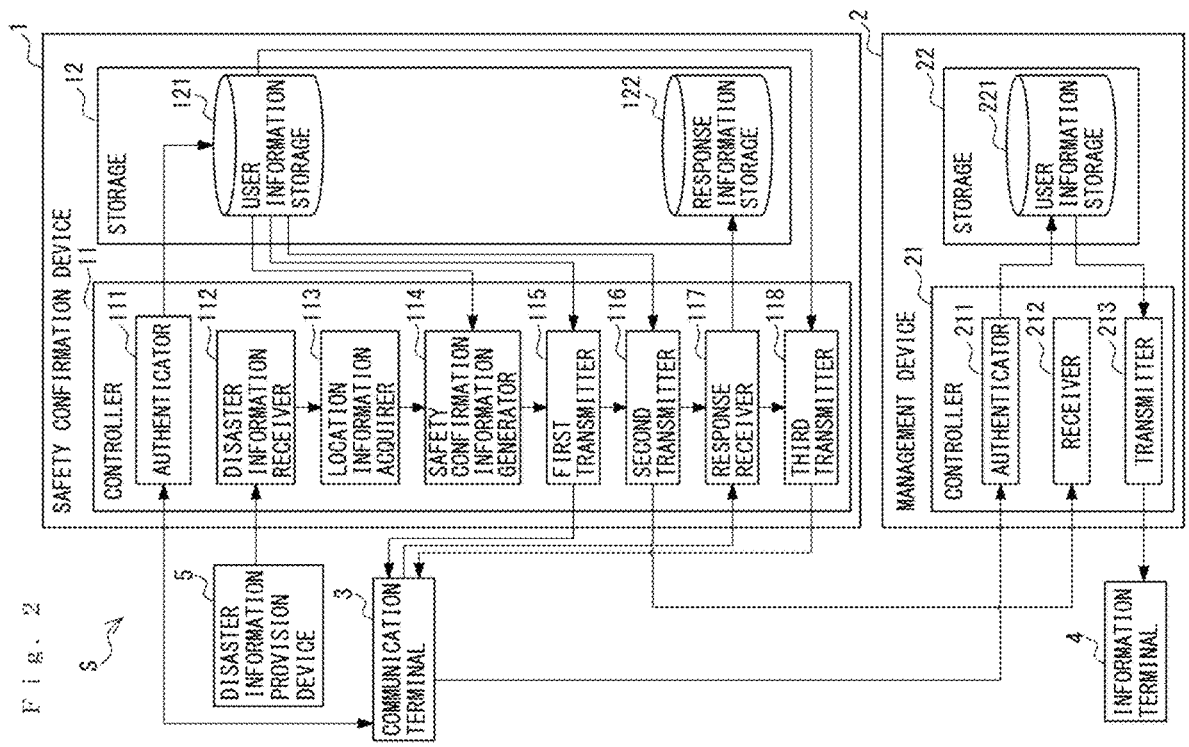
FIG. 2 is a block diagram of the safety confirmation system according to the embodiment.

FIG. 2 is a block diagram of the safety confirmation system S according to the present embodiment. In FIG. 2, the arrows indicate main data flows, and there may be data flows other than those illustrated in FIG. 2. In FIG. 2, each block illustrates not a hardware (device) unit component but a functional unit component. Thus, the block illustrated in FIG. 2 may be implemented with a single device, or may be implemented dispersedly over a plurality of devices. Data can be exchanged between blocks via any means, such as a data bus, a network, and a portable storage medium.

The safety confirmation device 1 includes a controller 11 and a storage 12. The controller 11 includes an authenticator 111, a disaster information receiver 112, a location information acquirer 113, a safety confirmation information generator 114, a first transmitter 115, a second transmitter 116, a response receiver 117, and a third transmitter 118. The storage 12 includes a user information storage 121 and a response information storage 122.

The storage 12 is a storage medium including a read only memory (ROM), a random access memory (RAM), a hard disk drive, and/or the like. The storage 12 stores in advance a program to be executed by the controller 11. The storage 12 may be provided outside the safety confirmation device 1, in which case, data may be exchanged with the controller 11 via a network. The user information storage 121 stores user information indicating information about a user. The response information storage 122 stores response information indicating a response input by a user. The user information storage 121 and the response information storage 122 may be respective storage areas in the storage 12, or may be databases configured in the storage 12.

The controller 11 is a processor such as a central processing unit (CPU), and, by executing a program stored in the storage 12, the controller 11 functions as the authenticator 111, the disaster information receiver 112, the location information acquirer 113, the safety confirmation information generator 114, the first transmitter 115, the second transmitter 116, the response receiver 117, and the third transmitter 118. At least some of the functions of the controller 11 may be performed by an electric circuit. Further, at least some of the functions of the controller 11 may be realized by a program executed by the controller 11 over a network.

The management device 2 includes a controller 21 and a storage 22. The controller 21 includes an authenticator 211, a receiver 212, and a transmitter 213. The storage 22 includes a user information storage 221.

The storage 22 is a storage medium including a ROM, a RAM, a hard disk drive, and/or the like. The storage 22 stores in advance a program to be executed by the controller 21. The storage 22 may be provided outside the management device 2, in which case, data may be exchanged with the controller 21 via a network. The user information storage 221 stores user information indicating information about a user. The user information storage 221 may be a storage area in the storage 22 or may be a database configured in the storage 22.

The controller 21 is, for example, a processor such as a CPU, and functions as the authenticator 211, the receiver 212, and the transmitter 213 by executing a program stored in the storage 22. At least some of the functions of the controller 21 may be performed by an electric circuit.

Further, at least some of the functions of the controller 21 may be realized by a program executed by the controller 21 over a network.

The safety confirmation system S according to the present embodiment is not limited to the specific configuration illustrated in FIG. 2. The safety confirmation device 1, the management device 2, the communication terminal 3, the information terminal 4, and the disaster information provision device 5 may be configured by connecting two or more of physically separated devices by wire or wirelessly. For example, the safety confirmation device 1 and the management device 2 may each be configured by a single computer, or may be configured by the cloud that is a collection of computer resources.

[Explanation of Setting Method]

First, a setting method of the communication terminal 3 and the information terminal 4 executed by the safety confirmation system S according to the present embodiment is described in detail. First, a user is authenticated by the safety confirmation device 1 at the communication terminal 3 possessed by the user.

Figure 3:
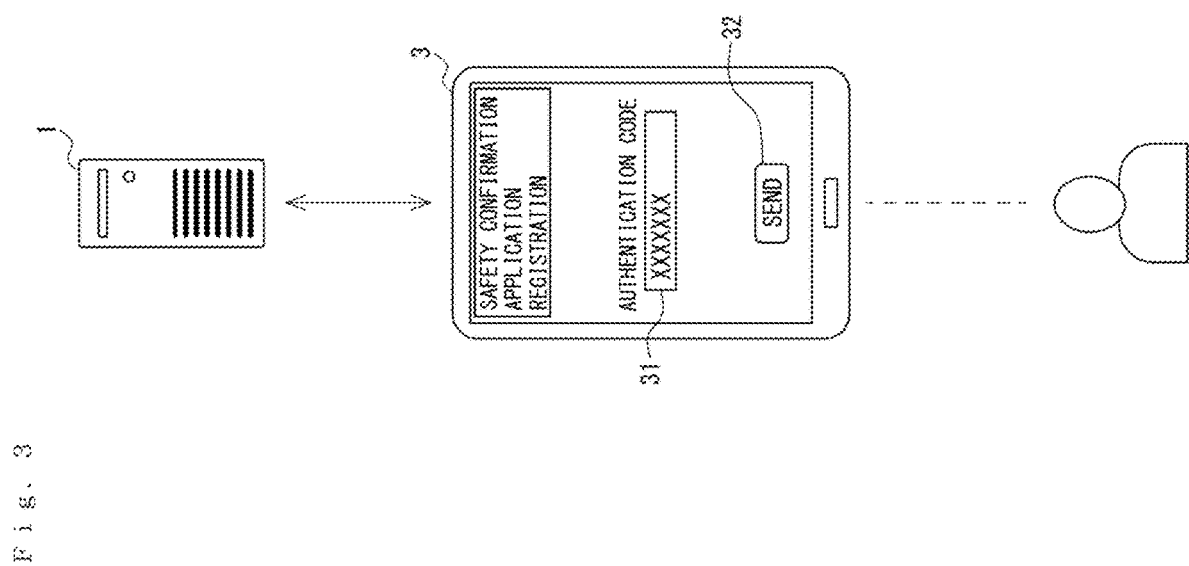
FIG. 3 is a schematic diagram of a method in which a safety confirmation device authenticates a communication terminal.

FIG. 3 is a schematic diagram of a method in which the safety confirmation device 1 authenticates the communication terminal 3. The communication terminal 3 displays an input field 31 and a button 32 on the display when a user performs an operation for being authenticated by the safety confirmation device 1 (for example, starting an application for confirming safety). The input field 31 is an area for inputting an authentication code (or a password). The authentication code is a string, a numerical value, or a binary value that is stored in advance in association with user information in the user information storage 121 of the safety confirmation device 1. The user information includes, for example, user identification information that can identify a user (a user ID or the like), the name of the user, and the telephone number of the user. The user information may also include other information about the user, such as an address and an e-mail address of the user. The button 32 is a virtual button or icon that can be pressed by a user.

The communication terminal 3 accepts input of an authentication code. The user inputs in the input field 31 and then presses the button 32 using the operation unit of the communication terminal 3. When the button 32 is pressed, the communication terminal 3 is triggered to transmit the input authentication code to the safety confirmation device 1 together with communication terminal information that can identify the communication terminal 3. The communication terminal information is, for example, cookie information stored in the communication terminal 3 or identification information allocated in advance to the communication terminal 3 (for example, IMEI: International Mobile Equipment Identity). The safety confirmation device 1 can identify the communication terminal 3 using the communication terminal information and transmit and receive information to and from the identified communication terminal 3.

In the safety confirmation device 1, the authenticator 111 receives the authentication code and communication terminal information transmitted by the communication terminal 3. When the received authentication code is associated with the user information in the user information storage 121, the authenticator 111 authenticates the communication terminal 3, associates the received communication terminal information with the user information associated with the authentication code that is then stored in the user information storage 121. Further, the authenticator transmits authentication information indicating that the communication terminal 3 has been authenticated to the communication terminal 3. The authentication information includes, for example, the user information. The communication terminal 3 receives the authentication information transmitted by the safety confirmation device 1 and stores the authentication information in a storage equipped in the communication terminal 3.

In this way, the authentication information of the user for the safety confirmation device 1 is stored in the communication terminal 3, so that the user does not need to be authenticated each time responding to safety confirmation information that is received from the safety confirmation device 1. The authentication of the communication terminal 3 by the safety confirmation device 1 is not limited to the specific method described herein, and may be performed by other methods.

Figure 4:
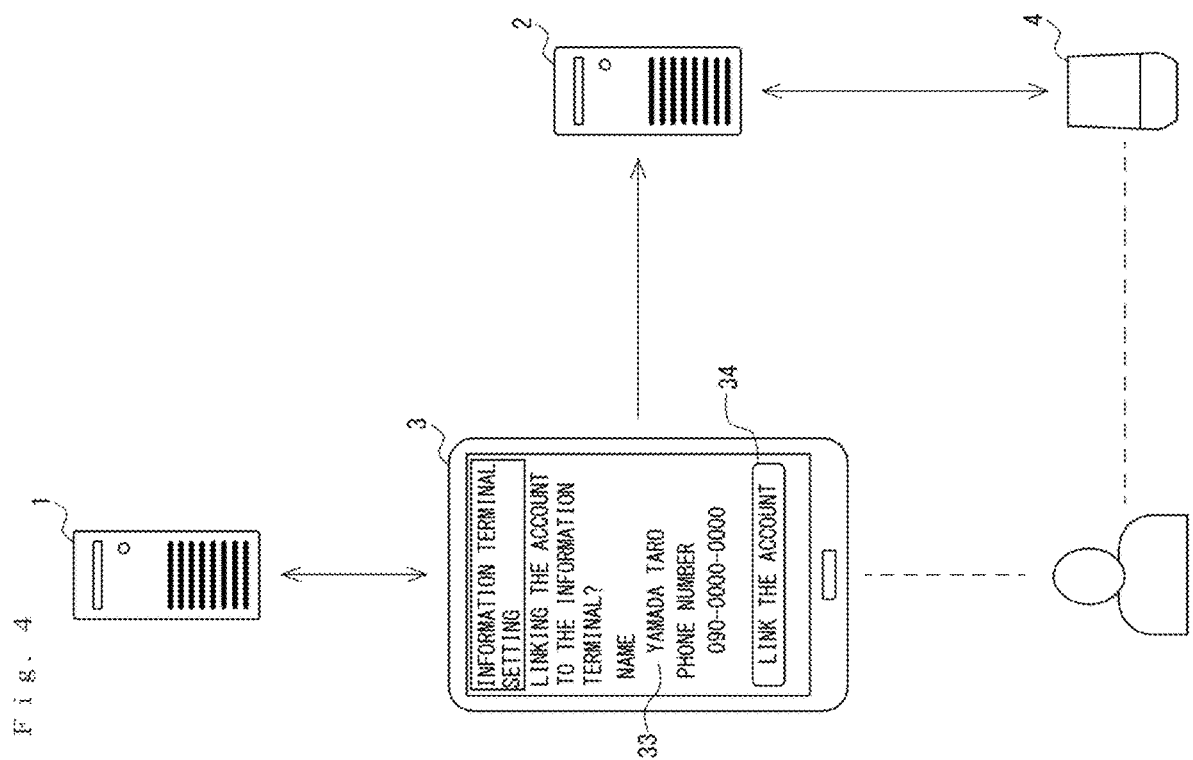
FIG. 4 is a schematic diagram of a method in which a management device registers an information terminal.

Next, at the communication terminal 3, the user registers an information terminal 4 that is different from the communication terminal 3, in the management device 2. FIG. 4 is a schematic diagram of a method in which the management device 2 registers the information terminal 4. When the user performs an operation for registering the information terminal 4 (for example, launching an application for registering the information terminal 4 in the management device 2), the communication terminal 3 displays user information 33 and a button 34 on the display. The user information 33 is at least some of the user information included in the authentication information for the safety confirmation device 1 that is stored in the storage. The button 34 is a virtual button or icon that can be pressed by the user.

The communication terminal 3 may display the screen illustrated in FIG. 3 when authentication information for the safety confirmation device 1 is not stored in the storage, that is, when the communication terminal 3 has not been authenticated by the safety confirmation device 1. In such a case, the communication terminal 3 displays the screen of FIG. 4 after the authentication of FIG. 3 has completed.

The user confirms the user information 33, and then presses the button 34 using the operation unit of the communication terminal 3. When the button 34 is pressed, the communication terminal 3 is triggered to transmit the authentication information for the safety confirmation device 1 that is stored in the storage, to the safety confirmation device 1 and the management device 2 together with the information terminal information that can identify the information terminal 4 to be registered. At this time, the communication terminal 3 may transmit only some of the authentication information (for example, the user identification information) stored in the storage to the management device 2. The information terminal information is identification information (for example, IMEI) allocated in advance to the information terminal 4. The management device 2 identifies the information terminal 4 using the information terminal information so that the management device 2 can transmit and receive information to and from the identified information terminal 4.

In the safety confirmation device 1, the authenticator 111 receives the authentication information and information terminal information transmitted by the communication terminal 3. The authenticator 111 associates the user information included in the received authentication information with the received information terminal information that is then stored in the user information storage 121. Whereas, in the management device 2, the authenticator 211 receives the authentication information and information terminal information transmitted by the communication terminal 3. The authenticator 211 associates the user information included in the received authentication information (that is, the authentication information of the user for the safety confirmation device 1 stored in the communication terminal 3) with the received information terminal information that is then stored in the user information storage 221. As a result, the safety confirmation device 1 and the management device 2 associate the user with the information terminal 4.

In this way, the user and the information terminal 4 are associated in the management device 2 based on the authentication information of the user for the safety confirmation device 1 that is stored in the communication terminal 3. As such, the user can receive the safety confirmation information from the safety confirmation system S through both the communication terminal 3 and the information terminal 4 without performing different setting operations for the communication terminal 3 and the information terminal 4. Registration of the information terminal 4 by the management device 2 is not limited to the specific method described herein, and may be performed by other methods.

[Explanation of Safety Confirmation Method]

Next, the safety confirmation method executed by the safety confirmation system S according to the present embodiment is described in detail. When a disaster occurs, the disaster information provision device 5 transmits disaster information indicating the details of the occurring disaster (for example, the type of the disaster, the magnitude of the disaster, and the location of the disaster) to the safety confirmation device 1. In the safety confirmation device 1, the disaster information receiver 112 receives the disaster information.

When the disaster information receiver 112 receives the disaster information, the location information acquirer 113 acquires location information indicating the locations of the communication terminal 3 and the information terminal 4 corresponding to the communication terminal information and information terminal information stored in the user information storage 121. The location information includes, for example, the coordinates of the communication terminal 3 and the information terminal 4. The location information acquirer 113 may receive the location information from the communication terminal 3 and the information terminal 4, or may receive the location information from a server or the like that communicates with the communication terminal 3 and the information terminal 4.

Next, the safety confirmation information generator 114 generates safety confirmation information for confirming safety of the user. The safety confirmation information includes options used as a response to safety confirmation, such as safe, minor injury, and severe injury. Further, the safety confirmation information generator 114 may generate safety confirmation information including the details of the disaster indicated by the disaster information received by the disaster information receiver 112.

Further, the safety confirmation information generator 114 may generate safety confirmation information, based on the relationship between the disaster information received by the disaster information receiver 112 and the location information acquired by the location information acquirer 113. For example, the safety confirmation information generator 114 generates safety confirmation information based on the disaster information when the location of the disaster indicated by the disaster information and the location of at least one of the communication terminal 3 or the information terminal 4 satisfy a predetermined condition (for example, the distance is a predetermined value or less). This allows the safety confirmation system S to confirm safety with respect to the disaster at the locations of the communication terminal 3 and the information terminal 4.

Next, the first transmitter 115 and the second transmitter 116 transmit the safety confirmation information generated by the safety confirmation information generator 114 to the communication terminal 3 and the information terminal 4 (the management device 2). Specifically, the first transmitter 115 identifies the communication terminal 3 (that is, the communication terminal 3 associated with the user) using the communication terminal information stored in the user information storage 121 and transmits the safety confirmation information to the identified communication terminal 3. At this time, the first transmitter 115 transmits the safety confirmation information to the communication terminal 3 without going through the management device 2.

The second transmitter 116 transmits the information terminal information stored in the user information storage 121 and the safety confirmation information to the management device 2. In other words, the second transmitter 116 transmits the safety confirmation information to the information terminal 4 through the management device 2. When the information terminal 4 includes a speaker terminal 4b, the second transmitter 116 may transmit, to the management device 2, voice data as the safety confirmation information for outputting the safety confirmation information by voice from a speaker equipped in the speaker terminal 4b as the information terminal 4.

The first transmitter 115 and the second transmitter 116 may simultaneously transmit the safety confirmation information to the communication terminal 3 and the information terminal 4 (the management device 2), or may transmit the safety confirmation information in a specific sequence.

In the management device 2, the receiver 212 receives the safety confirmation information transmitted by the safety confirmation device 1. The transmitter 213 identifies the information terminal 4 using the information terminal information stored in the user information storage 221 (that is, the information terminal 4 associated with the user), and transmits the safety confirmation information received by the receiver 212 to the identified information terminal 4.

Figure 5:
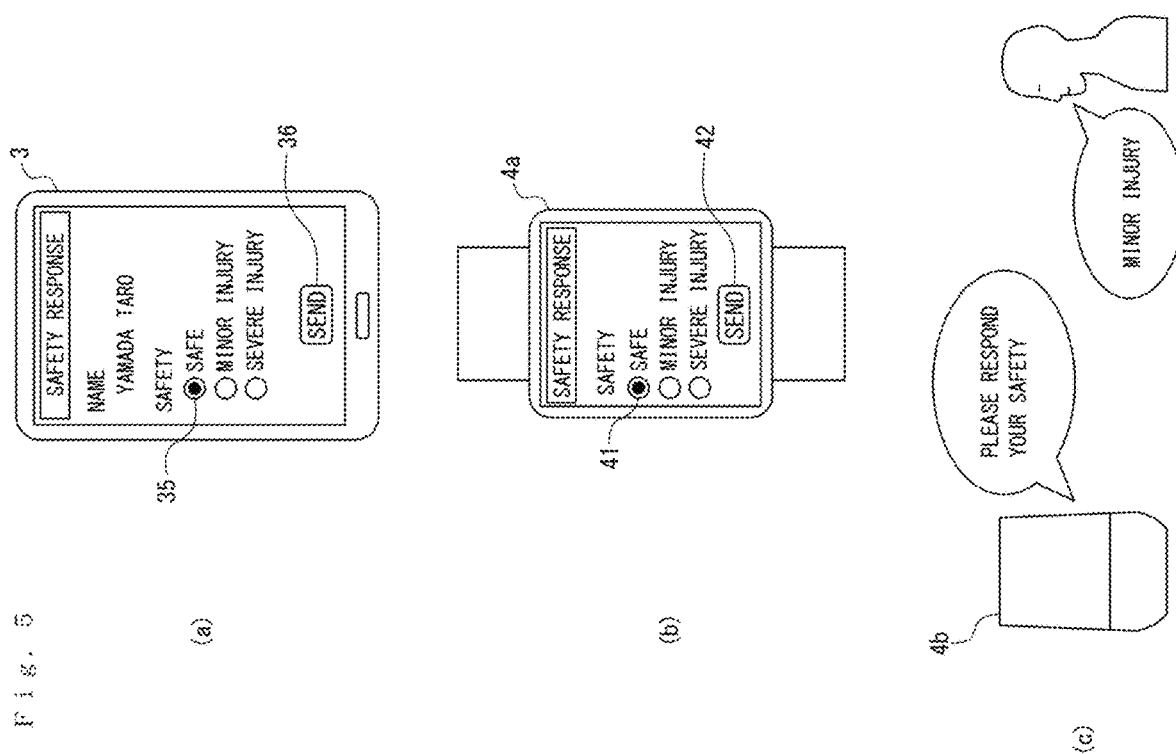
FIGS. 5A to 5C are schematic diagrams of a method in which the communication terminal and the information terminal output safety confirmation information.

The communication terminal 3 and the information terminal 4 (the wearable terminal 4a, the speaker terminal 4b) output the safety confirmation information received from the safety confirmation device 1 or the management device 2 for the user. The communication terminal 3 and the information terminal 4 then accept input of a response to the safety confirmation information. FIGS. 5A to 5C illustrate schematic diagrams of a method in which the communication terminal 3 and the information terminal 4 output the safety confirmation information.

FIG. 5A illustrates the communication terminal 3 that displays the safety confirmation information. When the communication terminal 3 receives the safety confirmation information, the communication terminal 3 displays a response field 35 and a button 36 on the display. The response field 35 is a field for inputting a response to the safety confirmation information. The response field 35 represents options, such as safe, minor injury, and severe injury, included in the safety confirmation information, and accepts selection of any one option. The response field 35 may accept free input of a character string as a response from the user. The button 36 is a virtual button or icon that can be pressed by the user.

The user inputs in the response field 35 using the operation unit of the communication terminal 3, and then presses the button 36. When the button 36 is pressed, the communication terminal 3 is triggered to transmit response information indicating the input response to the safety confirmation device 1.

FIG. 5B illustrates a wearable terminal 4a that displays the safety confirmation information. When the wearable terminal 4a receives the safety confirmation information, the wearable terminal 4a displays a response field 41 and a button 42 on the display. The response field 41 is a field for inputting a response to the safety confirmation information. The response field 41 represents options, such as safe, minor injury, and severe injury, included in the safety confirmation information, and accepts selection of any one option. The response field 41 may accept free input of a character string as a response from the user. The button 42 is a virtual button or icon that can be pressed by the user.

The user inputs the response field 41 using the operation unit of the wearable terminal 4a, and then presses the button 42. When the button 42 is pressed, the wearable terminal 4a is triggered to transmit response information indicating the input response to the management device 2. The management device 2 transfers the response information transmitted by the wearable terminal 4a to the safety confirmation device 1. Alternatively, the wearable device 4a may directly transmit the response information to the safety confirmation device 1.

FIG. 5C represents a speaker terminal 4b that outputs the safety confirmation information by voice. When the speaker terminal 4b receives the safety confirmation information, the speaker terminal 4b outputs voice from the audio outputter using the voice data of the safety confirmation information. The user utters a voice indicating a response to the safety confirmation information (safe, minor injury, severe injury or the like). The speaker terminal 4b accepts the input of the voice uttered by the user using the audio inputter. The speaker terminal 4b identifies the content indicated by the voice uttered by the user as a response by performing known speech recognition processing on the input voice. Then, the speaker terminal 4b transmits the response information indicating the identified response to the management device 2. The management device 2 transfers the response information transmitted by the speaker terminal 4b to the safety confirmation device 1. Alternatively, the speaker device 4b may directly transmit the response information to the safety confirmation device 1.

The speech recognition processing may be performed by the safety confirmation device 1 or the management device 2 instead of the speaker terminal 4b. In such a case, the speaker terminal 4b transmits the voice data of the voice uttered by the user to the safety confirmation device 1 or the management device 2 as the response information. The safety confirmation device 1 or the management device 2 identifies the content indicated by the voice uttered by the user as a response by performing known speech recognition processing on the voice indicated by the voice data received from the speaker terminal 4b.

The speaker terminal 4b may output the safety confirmation information by voice on the condition that the user makes a predetermined call to the speaker terminal 4b. In such a configuration, when the speaker terminal 4b has received the safety confirmation information, the speaker terminal 4b outputs information indicating that the safety confirmation information has been received through a display unit, such as an audio outputter, a lamp, and a monitor. The user makes a predetermined call to the speaker terminal 4b that output the information indicating that the safety confirmation information has been received. The call to the speaker terminal 4b is, for example, utterance of a predetermined word (such as "OK"). When the speaker terminal 4b detects the call by the user, the speaker terminal 4b outputs the safety confirmation information (for example, the type of the disaster, the magnitude of the disaster, and the location of the disaster) by voice. In this way, the speaker terminal 4b can output the safety confirmation information after confirming that the user is around.

After the speaker terminal 4b output the voice of the safety confirmation information, the communication terminal 3 may accept input of a response to the safety confirmation information. This allows the safety confirmation device 1 to obtain the response information of the user from the communication terminal 3 even when the speaker terminal 4b is unable to accept voice input.

In the safety confirmation device 1, the response receiver 117 receives the response information transmitted by at least one of the communication terminal 3 or the information terminal 4. The response receiver 117 stores the received response information in the response information storage 122 in association with the user (user information) of the communication terminal 3 and the information terminal 4. With such a configuration, the safety confirmation system S suppresses omission of a response to safety confirmation information by a user and can obtain responses from a larger number of users by transmitting the safety confirmation information to a plurality of terminals and receiving responses from the plurality of terminals.

When the response receiver 117 receives the response information from both the communication terminal 3 and the information terminal 4, the response receiver 117 stores the later response information (that is, the one with a later transmission time) in the response information storage 122. Alternatively, the response receiver 117 may store the response information transmitted by a predetermined one of the communication terminal 3 and the information terminal 4 in the response information storage 122. This allows the safety confirmation system S to, for example, preferentially store response input on the communication terminal 3 that is likely to be input an accurate response.

The safety confirmation system S can be trained to transmit safety confirmation information to a user and accept a response when a disaster is not really occurring. As described below, the safety confirmation system S executes different safety confirmation methods at the time of training and at the time of disaster occurrence.

Figure 6:
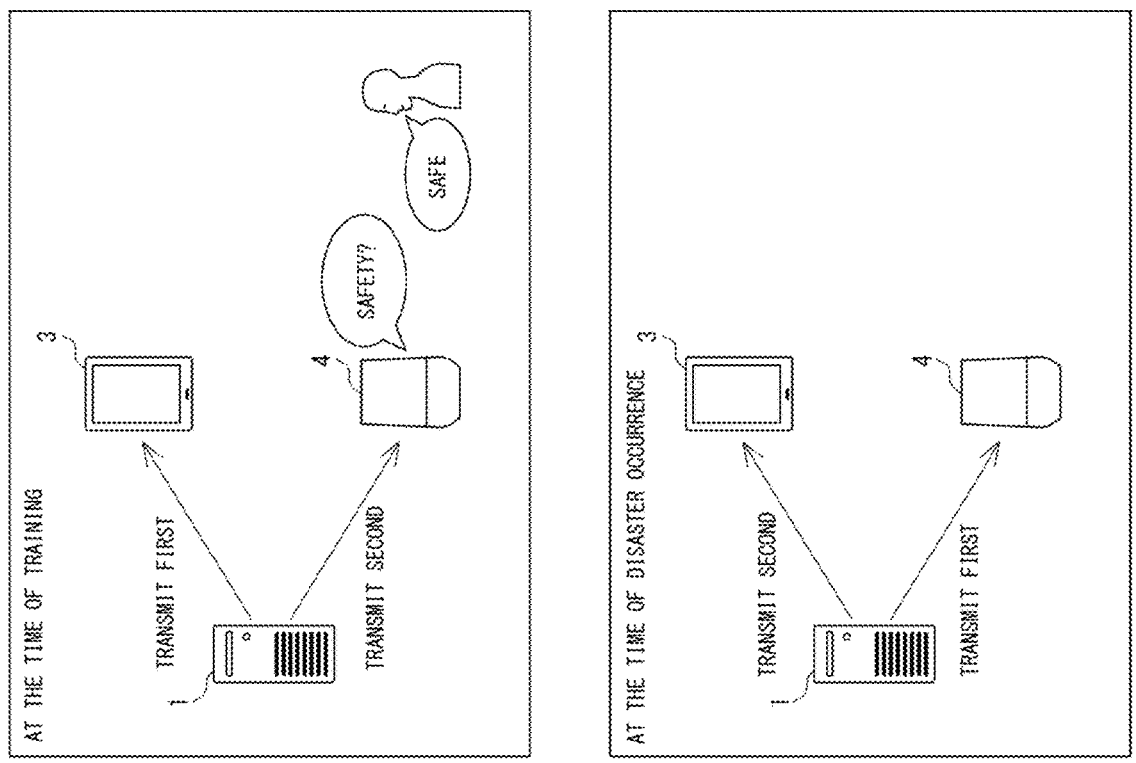
FIG. 6 is a schematic diagram of safety confirmation methods at the time of training and at the time of disaster.

FIG. 6 is a schematic diagram of safety confirmation methods at the time of training and at the time of disaster occurrence. The safety confirmation device 1 executes the safety confirmation method at the time of training when the administrator of the safety confirmation device 1 gave an instruction for training to the safety confirmation device 1, and executes the safety confirmation method at the time of disaster occurrence when the disaster information receiver 112 received disaster information.

The safety confirmation information generator 114 generates safety confirmation information for training at the time of training, and generates real safety confirmation information that is different from the safety confirmation information for training at the time of disaster occurrence. For example, the safety confirmation information for training does not include the details of a disaster, and the real safety confirmation information includes the details of the disaster. The first transmitter 115 and the second transmitter 116 transmit the safety confirmation information for training to the communication terminal 3 and the information terminal 4 (the management device 2) at the time of training, and transmit the real safety confirmation information at the time of disaster occurrence. When the information terminal 4 includes the speaker terminal 4b, the second transmitter 116 transmits voice data for training in order to output the safety confirmation information for training by voice to the information terminal 4 (the management device 2) at the time of training, and transmit real voice data in order to output the real safety confirmation information by voice at the time of disaster occurrence.

The first transmitter 115 and the second transmitter 116 may repeatedly transmit the real safety confirmation information with frequency that is different from the frequency of transmitting the safety confirmation information for training. This allows the safety confirmation system S to retransmit, for example, more frequently at the time of disaster occurrence than at the time of training to prompt a user to response.

Further, the first transmitter 115 and the second transmitter 116 may change the order of transmitting the real safety confirmation information to the communication terminal 3 and the information terminal 4, based on whether the response to the safety confirmation information for training was received from the communication terminal 3 or the information terminal 4. In the example of FIG. 6, the first transmitter 115 and the second transmitter 116 transmitted the safety confirmation information for training in the order of the communication terminal 3 and the information terminal 4 at the time of training. Then, the user input a response to the safety confirmation information for training on the information terminal 4.

In such a case, the first transmitter 115 and the second transmitter 116 transmit the real safety confirmation information in the order of the information terminal 4 and the communication terminal 3 at the time of disaster occurrence. This allows the safety confirmation system S to preferentially transmit safety confirmation information at the time of disaster occurrence to the terminal with which a user has responded at the time of training to prompt the user to respond.

Further, the first transmitter 115 and the second transmitter 116 may change the way in which the communication terminal 3 and the information terminal 4 output the real safety confirmation information based on whether or not the user has responded to the safety confirmation information for training. For example, the first transmitter 115 and the second transmitter 116 transmit real safety confirmation information to both the communication terminal 3 and the information terminal 4 for a user who did not respond to safety confirmation information for training, and transmit real safety confirmation information to only one of the communication terminal 3 and the information terminal 4 for a user who responded to safety confirmation information for training. This allows the safety confirmation system S to actively transmit safety confirmation information to a user who did not respond at the time of training to prompt the user to response.

The first transmitter 115 and the second transmitter 116 may change the transmission destination of safety confirmation information between the communication terminal 3 and the information terminal 4, based on the distance between the communication terminal 3 and the information terminal 4. FIGS. 7A and 7B are schematic diagrams of a method of changing the transmission destination according to the distance D between the communication terminal 3 and the information terminal 4.

As illustrated in FIG. 7A, when the distance D between the communication terminal 3 and the information terminal 4 is equal to or greater than a predetermined reference value, the first transmitter 115 and the second transmitter 116 transmit safety confirmation information to both the communication terminal 3 and the information terminal 4. On the other hand, as illustrated in FIG. 7B, when the distance D between the communication terminal 3 and the information terminal 4 is less than the predetermined reference value, the first transmitter 115 and the second transmitter 116 transmit safety confirmation information to a predetermined one of the communication terminal 3 and the information terminal 4. The reference value of the distance D is stored in the storage 12 in advance. This allows the safety confirmation system S to output safety confirmation information from only one of the communication terminal 3 and the information terminal 4 when the communication terminal 3 and the information terminal 4 are nearby, thereby preventing confusion of the user. On the other hand, the safety confirmation system S outputs safety confirmation information from both the communication terminal 3 and the information terminal 4 when the communication terminal 3 and the information terminal 4 are far away from each other, so that a user can respond whether the user is near the communication terminal 3 or the information terminal 4.

Figure 8:
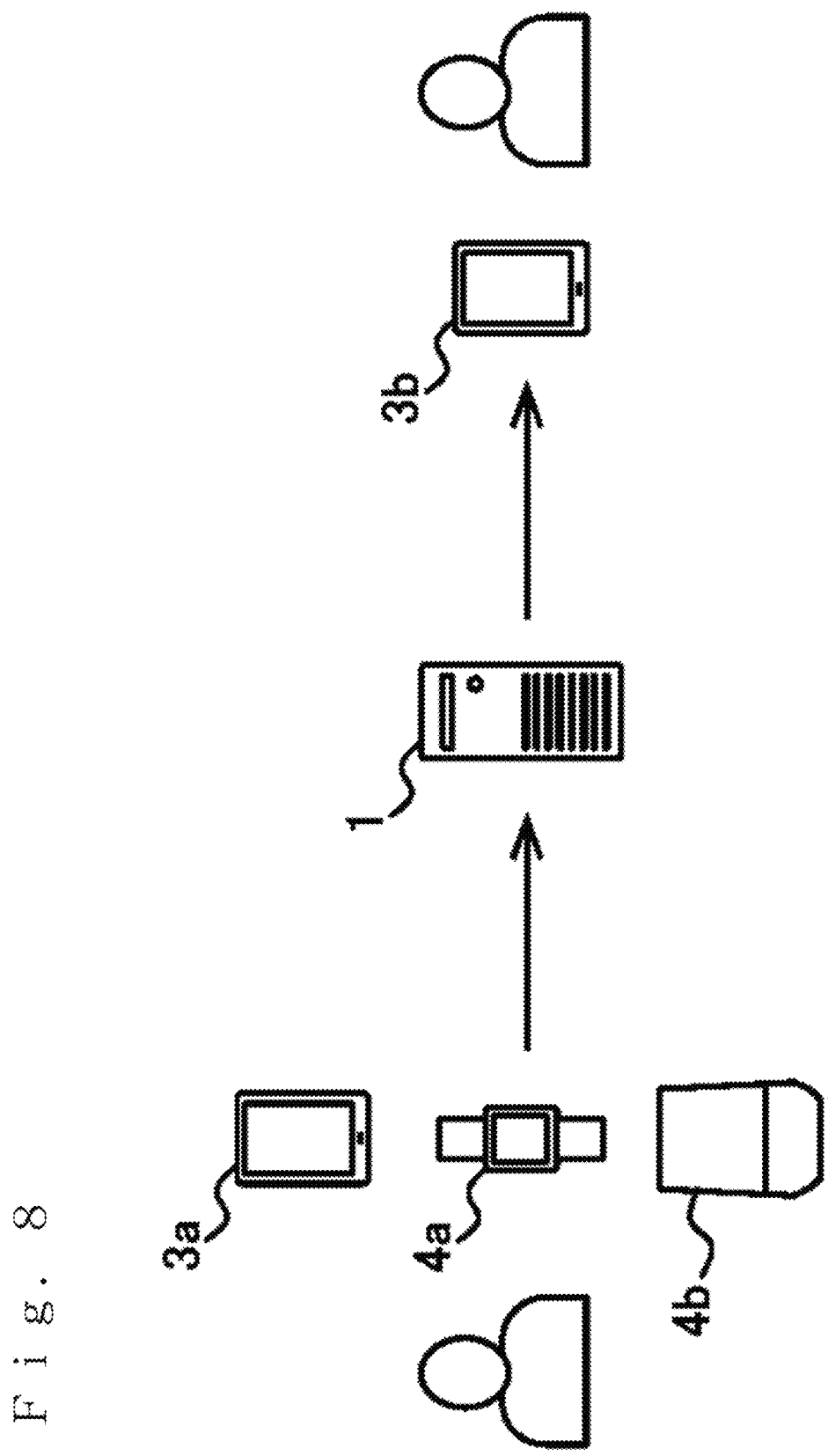
FIG. 8 is a schematic diagram of a method in which a third transmitter transmits a user's response to a family member of the user.

In the safety confirmation device 1, after the response receiver 117 receives a response from the user, the third transmitter 118 transmits the response from the user to a terminal possessed by a family member of the user. FIG. 8 is a schematic diagram of a method in which the third transmitter 118 transmits a response of the user to a family member of the user.

The response receiver 117 of the safety confirmation device 1 receives a response to the safety confirmation information from at least one of a user terminal 3a that is the communication terminal 3 possessed by the user, the wearable terminal 4a, or the speaker terminal 4b. The user information storage 121 stores in advance the communication terminal information of a family terminal 3b that is the communication terminal 3 possessed by a family member of the user in association with the user information of the user who possesses the user terminal 3a. The third transmitter 118 identifies the family terminal 3b associated with the user information of the user who transmitted the response and transmits the response to the identified family terminal 3b.

This allows the safety confirmation system S to notify the user's family member of the response received from the user. The third transmitter 118 may transmit the response of the user to an information terminal 4 possessed by the user's family member in place of or in addition to the family terminal 3b.

[Sequence of Safety Confirmation Method]

FIG. 9 is a sequence diagram of a safety confirmation method executed by the safety confirmation system S according to the present embodiment. The communication terminal 3 accepts input of an authentication code (S11). The user inputs the authentication code on the communication terminal 3 possessed by the user. The communication terminal 3 transmits the input authentication code to the safety confirmation device 1 together with the communication terminal information that can identify the communication terminal 3.

In the safety confirmation device 1, the authenticator 111 receives the authentication code and communication terminal information transmitted by the communication terminal 3. When the received authentication code is associated with user information in the user information storage 121, the authenticator 111 authenticates the communication terminal 3, associates the received communication terminal information with the user information associated with the authentication code that is then stored in the user information storage 121 (S12). Further, the authenticator transmits authentication information indicating that the communication terminal 3 has been authenticated to the communication terminal 3. The communication terminal 3 receives the authentication information transmitted by the safety confirmation device 1 and stores the authentication information in the storage equipped in the communication terminal 3.

Next, the user performs an operation, at the communication terminal 3, for registering the information terminal 4 that is different from the communication terminal 3 in the management device 2 (S13). The communication terminal 3 transmits the authentication information for the safety confirmation device 1 that is stored in the storage, to the safety confirmation device 1 and the management device 2 together with the information terminal information that can identify the information terminal 4 to be registered.

In the safety confirmation device 1, the authenticator 111 receives the authentication information and information terminal information transmitted by the communication terminal 3. The authenticator 111 associates the user information included in the received authentication information with the received information terminal information that is then stored in the user information storage 121. In the management device 2, the authenticator 211 receives the authentication information and information terminal information transmitted by the communication terminal 3. The authenticator 211 associates the user information included in the received authentication information (that is, the authentication information of the user for the safety confirmation device 1 stored in the communication terminal 3) with the received information terminal information that is then stored in the user information storage 221. As a result, the safety confirmation device 1 and the management device 2 associate the user with the information terminal 4 (S14).

When a disaster occurs, the disaster information provision device 5 transmits disaster information indicating the details of the disaster (for example, the type of the disaster, the magnitude of the disaster, and the location of the disaster) to the safety confirmation device 1. In the safety confirmation device 1, the disaster information receiver 112 receives the disaster information (S15). When the disaster information receiver 112 receives the disaster information, the location information acquirer 113 acquires location information indicating the locations of the communication terminal 3 and the information terminal 4 corresponding to the communication terminal information and information terminal information stored in the user information storage 121.

The safety confirmation information generator 114 generates safety confirmation information for confirming safety of the user (S16). At this time, the safety confirmation information generator 114 may generate safety confirmation information including the details of the disaster indicated by the disaster information received by the disaster information receiver 112. Further, the safety confirmation information generator 114 may generate safety confirmation information based on the relationship between the disaster information received by the disaster information receiver 112 and the location information acquired by the location information acquirer 113.

The first transmitter 115 and the second transmitter 116 transmit the safety confirmation information generated by the safety confirmation information generator 114 to the communication terminal 3 and the management device 2 (S17). In the management device 2, the receiver 212 receives the safety confirmation information transmitted by the safety confirmation device 1. The transmitter 213 identifies the information terminal 4 (that is, the information terminal 4 associated with the user) using the information terminal information stored in the user information storage 221 and transmits the safety confirmation information received by the receiver 212 to the identified information terminal 4 (S18).

The communication terminal 3 and the information terminal 4 output the safety confirmation information received from the safety confirmation device 1 or the management device 2 for the user (S19). The communication terminal 3 and the information terminal 4 accept input of a response to the safety confirmation information (S20). The communication terminal 3 transmits response information indicating the input response to the safety confirmation device 1. The information terminal 4 transmits the response information indicating the input response to the management device 2. The management device 2 further transfers the response information transmitted by the information terminal 4 to the safety confirmation device 1.

In the safety confirmation device 1, the response receiver 117 receives the response information transmitted by at least one of the communication terminal 3 or the information terminal 4. The response receiver 117 stores the received response information in the response information storage 122 in association with the user (user information) of the communication terminal 3 and the information terminal 4 (S21). Thereafter, the third transmitter 118 may transmit the response of the user received by the response receiver 117 to the family terminal 3*b* or information terminal 4 possessed by a family member of the user.

EFFECT OF THE EMBODIMENTS

The safety confirmation system S according to the present embodiment associates a user with the information terminal 4 based on authentication information for the safety confirmation device 1 stored in the communication terminal 3. When a disaster occurs, the safety confirmation system S transmits safety confirmation information to the communication terminal 3 with which the user has been authenticated and to the information terminal 4 that is associated with the user in the management device 2. As a result, the user can receive the safety confirmation information from the safety confirmation system S through both the communication terminal 3 and the information terminal 4 without performing different setting operations for the communication terminal 3 and the information terminal 4. In this way, the safety confirmation system S can simplify an operation required for a user to use the safety confirmation system S. In addition, the safety confirmation system S suppresses omission of a response by a user to safety confirmation information and can obtain responses from a larger number of users by transmitting the safety confirmation information to a plurality of terminals.

Although, as described above, the present invention has been described using some example embodiments, the technical range of the present invention is not limited to the range described in the above embodiments, and various variants and modifications can be made within the scope of the principle of the invention. For example, all or part of the device can be functionally or physically distributed or integrated in any units. A new embodiment resulting from any combination of a plurality of embodiments is also included in the embodiments of the present invention. The effect of the new embodiment resulting from any combination also includes the effect of the original embodiments.

The processors of the safety confirmation device 1, the management device 2, the communication terminal 3, and the information terminal 4 are the subjects of each step (process) included in the safety confirmation method illustrated in FIG. 9. That is, the processors of the safety confirmation device 1, the management device 2, the communication terminal 3, and the information terminal 4 realize the safety confirmation method illustrated in FIG. 9 by reading out a program for executing the safety confirmation method illustrated in FIG. 9 from a storage and executing the program to control each unit of the safety confirmation system S. The steps included in the safety confirmation method illustrated in FIG. 9 may be partially omitted, the order between the steps may be changed, and a plurality of steps may be performed in parallel.

REFERENCES SIGNS LIST

S Safety confirmation system
1 Safety confirmation device
11 Controller
111 Authenticator
112 Disaster information receiver
113 Location information acquirer
114 Safety confirmation information generator
115 First transmitter
116 Second transmitter
117 Response receiver
118 Third transmitter
2 Management device
21 Controller
211 Authenticator
212 Receiver
213 Transmitter
3 Communication terminal
4 Information terminal

The invention claimed is:

1. A safety confirmation system, comprising:
a safety confirmation device to communicate with a communication terminal that is possessed by a user; and
a management device to manage an information terminal that is different from the communication terminal, wherein
the safety confirmation device includes:
a generator to generate safety confirmation information for confirming safety of the user;
a first transmitter to transmit the safety confirmation information to the communication terminal; and
a second transmitter to transmit the safety confirmation information to the management device,
the management device includes:
an authenticator to associate and store information for identifying the user and information for identifying the information terminal in a storage, based on authentication information of the user for the safety confirmation device; and
a transmitter to transmit the safety confirmation information received from the safety confirmation device to the information terminal identified by the information that is associated with the information for identifying the user in the storage,
the generator generates safety confirmation information for training as the safety confirmation information at a time of training, and generates real safety confirmation information that is different from the safety confirmation information for training as the safety confirmation information at a time of disaster occurrence, and
the second transmitter transmits voice data for training in order to output the safety confirmation information for training by voice from a speaker included in the information terminal to the management device at the time of training, and transmits real voice data in order to output the real safety confirmation information by voice from the speaker to the management device at the time of disaster occurrence.

2. The safety confirmation system according to claim 1, wherein
the first transmitter transmits the safety confirmation information to the communication terminal without going through the management device, and
the second transmitter transmits the safety confirmation information to the information terminal through the management device.

3. The safety confirmation system according to claim 2, wherein the safety confirmation device further comprises a response receiver to receive a response to the safety confirmation information from at least one of the communication terminal or the information terminal.

4. The safety confirmation system according to claim 2, wherein
the generator generates the safety confirmation information for training as the safety confirmation information at the time of training, and generates the real safety confirmation information as the safety confirmation information at the time of disaster occurrence, and
the first transmitter and the second transmitter transmit the real safety confirmation information with frequency that is different from frequency of transmitting the safety confirmation information for training.

5. The safety confirmation system according to claim 2, wherein
the safety confirmation device further comprises a disaster information receiver to receive disaster information indicating details of a disaster, and
the generator generates the safety confirmation information based on the disaster information received by the disaster information receiver.

6. The safety confirmation system according to claim 2, wherein
the safety confirmation device further comprises a location information acquirer to acquire location information indicating locations of the communication terminal and the information terminal, and
the first transmitter and the second transmitter transmit the safety confirmation information to both the communication terminal and the information terminal when a distance between the location of the communication terminal and the location of the information terminal is equal to or greater than a reference value, and transmit the safety confirmation information to a predetermined one of the communication terminal and the information terminal when the distance between the location of the communication terminal and the location of the information terminal is less than the reference value.

7. The safety confirmation system according to claim 1, wherein the safety confirmation device further comprises a response receiver to receive a response to the safety confirmation information from at least one of the communication terminal or the information terminal.

8. The safety confirmation system according to claim 7, wherein the safety confirmation device further comprises a third transmitter to transmit the response to at least one of a communication terminal or information terminal associated with a family member of the user when the response receiver receives the response.

9. The safety confirmation system according to claim 7, wherein
the generator generates the safety confirmation information for training as the safety confirmation information at the time of training, and generates the real safety confirmation information as the safety confirmation information at the time of disaster occurrence, and
the first transmitter and the second transmitter transmit the real safety confirmation information with frequency that is different from frequency of transmitting the safety confirmation information for training.

10. The safety confirmation system according to claim 7, wherein
the safety confirmation device further comprises a location information acquirer to acquire location information indicating locations of the communication terminal and the information terminal, and
the first transmitter and the second transmitter transmit the safety confirmation information to both the communication terminal and the information terminal when a distance between the location of the communication terminal and the location of the information terminal is equal to or greater than a reference value, and transmit the safety confirmation information to a predetermined one of the communication terminal and the information terminal when the distance between the location of the communication terminal and the location of the information terminal is less than the reference value.

11. The safety confirmation system according to claim 1, wherein
the safety confirmation device further comprises a disaster information receiver to receive disaster information indicating details of a disaster, and
the generator generates the safety confirmation information based on the disaster information received by the disaster information receiver.

12. The safety confirmation system according to claim 11, wherein
the safety confirmation device further comprises a location information acquirer to acquire location information indicating locations of the communication terminal and the information terminal, and
the generator generates the safety confirmation information based on the disaster information at the location of at least one of the communication terminal or the information terminal.

13. The safety confirmation system according to claim 1, wherein
the authenticator associates and stores the information for identifying the user and the information for identifying the information terminal in the storage, based on the authentication information of the user that is stored in the communication terminal.

14. A safety confirmation system, comprising:
a safety confirmation device to communicate with a communication terminal that is possessed by a user; and
a management device to manage an information terminal that is different from the communication terminal, wherein
the safety confirmation device includes:
a generator to generate safety confirmation information for confirming safety of the user;
a first transmitter to transmit the safety confirmation information to the communication terminal; and
a second transmitter to transmit the safety confirmation information to the management device,
the management device includes:
an authenticator to associate and store information for identifying the user and information for identifying the information terminal in a storage, based on authentication information of the user for the safety confirmation device; and
a transmitter to transmit the safety confirmation information received from the safety confirmation device to the information terminal identified by the information that is associated with the information for identifying the user in the storage,
the safety confirmation device further comprises a response receiver to receive a response to the safety confirmation information from at least one of the communication terminal or the information terminal,
the generator generates safety confirmation information for training as the safety confirmation information at a time of training, and generates real safety confirmation information as the safety confirmation information at a time of disaster occurrence, and
based on whether the response receiver received the response to the safety confirmation information for training from the communication terminal or the information terminal, the first transmitter and the second transmitter change an order in which the real safety confirmation information is transmitted to the communication terminal and the information terminal.

15. The safety confirmation system according to claim 14, wherein
the authenticator associates and stores the information for identifying the user and the information for identifying the information terminal in the storage, based on the authentication information of the user that is stored in the communication terminal.

16. A safety confirmation system, comprising:
a safety confirmation device to communicate with a communication terminal that is possessed by a user; and
a management device to manage an information terminal that is different from the communication terminal, wherein
the safety confirmation device includes:
a generator to generate safety confirmation information for confirming safety of the user;
a first transmitter to transmit the safety confirmation information to the communication terminal; and
a second transmitter to transmit the safety confirmation information to the management device,
the management device includes:
an authenticator to associate and store information for identifying the user and information for identifying the information terminal in a storage, based on authentication information of the user for the safety confirmation device; and
a transmitter to transmit the safety confirmation information received from the safety confirmation device to the information terminal identified by the information that is associated with the information for identifying the user in the storage,
the generator generates safety confirmation information for training as the safety confirmation information at a time of training, and generates real safety confirmation information as the safety confirmation information at a time of disaster occurrence, and
the first transmitter and the second transmitter transmit the real safety confirmation information with frequency that is different from frequency of transmitting the safety confirmation information for training.

17. The safety confirmation system according to claim 16, wherein
the authenticator associates and stores the information for identifying the user and the information for identifying the information terminal in the storage, based on the authentication information of the user that is stored in the communication terminal.

18. A safety confirmation system, comprising:
a safety confirmation device to communicate with a communication terminal that is possessed by a user; and
a management device to manage an information terminal that is different from the communication terminal,
wherein the safety confirmation device includes:
a generator to generate safety confirmation information for confirming safety of the user;
a first transmitter to transmit the safety confirmation information to the communication terminal; and
a second transmitter to transmit the safety confirmation information to the management device,
the management device includes:
an authenticator to associate and store information for identifying the user and information for identifying the information terminal in a storage, based on authentication information of the user for the safety confirmation device; and
a transmitter to transmit the safety confirmation information received from the safety confirmation device to the information terminal identified by the information that is associated with the information for identifying the user in the storage,
the safety confirmation device further comprises a location information acquirer to acquire location information indicating locations of the communication terminal and the information terminal, and
the first transmitter and the second transmitter transmit the safety confirmation information to both the communication terminal and the information terminal when a distance between the location of the communication terminal and the location of the information terminal is equal to or greater than a reference value, and transmit the safety confirmation information to a predetermined one of the communication terminal and the information terminal when the distance between the location of the communication terminal and the location of the information terminal is less than the reference value.

19. The safety confirmation system according to claim 18, wherein
the authenticator associates and stores the information for identifying the user and the information for identifying the information terminal in the storage, based on the authentication information of the user that is stored in the communication terminal.

\* \* \* \* \*